US009258389B2

(12) United States Patent
Kalevo et al.

(10) Patent No.: US 9,258,389 B2
(45) Date of Patent: *Feb. 9, 2016

(54) ENCODER AND METHOD

(71) Applicant: GURULOGIC MICROSYSTEMS OY, Turku (FI)

(72) Inventors: Ossi Mikael Kalevo, Toijala (FI); Tuomas Kärkkäinen, Turku (FI)

(73) Assignee: GURULOGIC MICROSYSTEMS OY, Turku (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/163,820

(22) Filed: Jan. 24, 2014

(65) Prior Publication Data
US 2014/0140359 A1 May 22, 2014

Related U.S. Application Data

(63) Continuation-in-part of application No. 13/584,005, filed on Aug. 13, 2012, now Pat. No. 8,675,731.

(51) Int. Cl.
*H04N 19/119* (2014.01)
*H04L 29/06* (2006.01)
(Continued)

(52) U.S. Cl.
CPC .............. *H04L 69/04* (2013.01); *H04N 19/119* (2014.11); *H04N 19/154* (2014.11);
(Continued)

(58) Field of Classification Search
CPC ................. H04N 19/00781; H04N 19/00278; H04N 19/00157; H04N 19/00266; H04N 19/00775; H04N 19/00066; H04N 19/00357; H04N 19/00818; H04N 19/00909; H04N 19/0026; H04N 19/00078; H04N 19/00848; H04N 19/00903; H04N 7/30; H04N 19/00006; H04N 19/00272; H04N 7/26244; H04N 7/26319; H04N 19/154; H04N 19/136; H04N 19/192; H04N 19/172; H04N 19/119; H04N 19/12; H04N 19/60; H04N 19/17; H04N 19/176; H04N 19/33; G06T 9/007; G06T 2207/20021; G06T 2207/20052
USPC ................ 375/240.01–240.29; 382/232–253; 348/384.1–399.1, 400.1–440.1
See application file for complete search history.

(56) References Cited

U.S. PATENT DOCUMENTS 5,832,130 A 11/1998 Kim
6,529,634 B1 3/2003 Thyagarajan et al.
(Continued)

FOREIGN PATENT DOCUMENTS

EP 1 950 973 A1 7/2008
GB 2 274 754 A 8/1994
(Continued)

OTHER PUBLICATIONS

Notification of Ground of Rejection, dated Jul. 2, 2014, issued by Japanese Patent Office in a related Japanese Patent Application No. 2013-165759 and its partial English translation of relevant portions (16 pages).
(Continued)

*Primary Examiner* — Sath V Perungavoor
*Assistant Examiner* — Nathnael Aynalem
(74) *Attorney, Agent, or Firm* — Robert P. Michal, Esq.; Carter, DeLuca, Farrell & Schmidt, LLP

(57) ABSTRACT

An encoder includes data processing hardware which is operable: to divide input data into a plurality of blocks or packets; to apply a plurality of transformations to content of the blocks or packets to generate corresponding transformed data; to check a quality of representation of the transformed data prior to application of the transformations to determine whether or not the quality of representation of the transformed data satisfies one or more quality criteria; if the quality of representation of the transformed data does not satisfy the one or more quality criteria, to sub-divide and/or to combine the one or more blocks or packets further and repeating the transformation step; and if the quality of representation of the transformed data satisfies the one or more quality criteria, to output the transformed data to provide encoded output data representative of the input data to be encoded.

31 Claims, 8 Drawing Sheets

(51) Int. Cl.
  *H04N 19/172* (2014.01)
  *H04N 19/154* (2014.01)
  *H04N 19/192* (2014.01)
  *H04N 19/96* (2014.01)
  *H04N 19/12* (2014.01)
  *H04N 19/136* (2014.01)

(52) U.S. Cl.
  CPC .......... *H04N 19/172* (2014.11); *H04N 19/192* (2014.11); *H04N 19/12* (2014.11); *H04N 19/136* (2014.11); *H04N 19/96* (2014.11)

(56) References Cited

U.S. PATENT DOCUMENTS

| | | |
|---|---|---|
| 7,379,496 B2 | 5/2008 | Holcomb et al. |
| 7,676,101 B2 | 3/2010 | Sato et al. |
| 7,995,849 B2 | 8/2011 | Raveendran et al. |
| 8,018,994 B2 | 9/2011 | Tong et al. |
| 8,270,738 B2 | 9/2012 | Raveendran et al. |
| 2006/0013235 A1 | 1/2006 | Farnham |
| 2006/0204115 A1* | 9/2006 | Burazerovic ............... 382/239 |
| 2012/0027083 A1* | 2/2012 | Narroschke et al. ..... 375/240.03 |

FOREIGN PATENT DOCUMENTS

| | | |
|---|---|---|
| JP | 2006-074728 A | 3/2006 |
| JP | 2007-243427 A | 9/2007 |
| JP | 2009-194474 A | 8/2009 |
| WO | WO 2010/087807 A1 | 8/2010 |

OTHER PUBLICATIONS

Bumshik Lee et al "A hierarchical variable-sized block. . . ", 2010 Picture Coding Symposium (PCS 2010); Nagoya, Japan, Dec. 8-10, 2010, IEEE, Piscataway, NJ, pp. 522-525.

European Search Report dated Nov. 20, 2013 issued in European Application No. 13002521.6-1908, 9 pages.

Search Report under Section 17 dated Oct. 26, 2012 issued by the U.K. Patent Office in related U.K. Application No. GB 12144143.3 (4 pages).

European Office Action, dated Dec. 12, 2014, issued by European Patent Office in a related European Patent Application No. 13002521.6-1908 (6 pages).

Russian Office Action dated Nov. 24, 2014 issued by the Russian Patent Office in related Russian Patent Application No. 2013137368/08, along with an English language translation (7 pages).

Japanese Office Action, dated Apr. 1, 2015, issued by the Japanese Patent Office in related Japanese Patent Application No. 2013-165758 (5 pages) and English language translation (7 pages).

\* cited by examiner

ENCODER AND METHOD

CROSS-REFERENCE TO RELATED APPLICATIONS

This is a continuation-in-part of U.S. patent application Ser. No. 13/584,005, filed Aug. 13, 2012, which claims the benefit under 35 USC 119(a) and 37 CFR 1.55 to UK Patent Application No. 1214414.3 filed on Aug. 13, 2012, the entire contents of each of which is incorporated herein by reference.

FIELD

The present disclosure relates to encoders for receiving input data and encoding the input data to generate corresponding encoded output data. Moreover, the present disclosure also concerns methods of encoding input data to generate corresponding encoded output data. Furthermore, the present disclosure also concerns software products recorded on non-transitory machine-readable data storage media, wherein the software products are executable upon computing hardware for implementing aforesaid methods.

BACKGROUND INFORMATION

Data content is stored and communicated to an increasing extent by contemporary human population, for example multimedia content via Internet and wireless communication networks; such multimedia content often includes, for example images, video and audio, but is not limited thereto. The data content is stored and communicated between devices, software applications, media systems and data services. During such storage and communication, situations arise where images and video are captured, scanned, transmitted, shared, watched and printed. However, such images and videos are demanding in respect of data memory capacity and communication system bandwidth utilized. When communication system bandwidth is limited, such images and videos take significant time to communicate. For addressing such storage requirements, it has been customary practice to employ image and video encoding methods which also provide a degree of data compression. Some contemporary encoding standards for images and video are provided in Table 1.

TABLE 1

| contemporary encoding standards | | | | |
|---|---|---|---|---|
| JPEG | MPEG-1 | H.261 | WebP | Lucid |
| JPEG2000 | MPEG-2 | H.263 | WebM | GIF |
| JPEG XR | MPEG-4 | H.264 | | PNG |
| | MPEG-4 AVC | HEVC | | TIFF |
| | MPEG-4 MVC | | | BMP |
| | MP3 | | | VC-1 |
| | | | | Theora |
| | | | | AAC |
| | | | | FLAC |
| | | | | Ogg Vorbis |
| | | | | Speex |

Image and audio files are becoming larger as image quality is progressively improved, for example by adoption of high definition (HD) standards and high dynamic range (HDR). However, 3-dimensional (3-D) images, videos and audio are gaining increasing popularity which demands correspondingly more efficient encoding and decoding methods in encoders and decoders, namely "codecs", to cope with associated increased quantities of data to be communicated and stored. However, it is highly desirable that encoding methods that provide a degree of data compression should be substantially lossless in relation to information content when generating the compressed data.

Conventional codecs are described in earlier published patent applications and granted patents, for example as provided in Table 2.

TABLE 2

| earlier literature describing codecs | |
|---|---|
| Earlier patents or patent applications | Details |
| U.S. Pat. No. 5,832,130 | |
| U.S. Pat. No. 7,379,496 | |
| GB2274754A1 | Samsung Electronics Co. Ltd. |
| US6529634A1 | Thyagarajan |
| U.S. Pat. No. 7,676,101 | |
| US2006/0204115A1 | Burazerovic: employs a single type of encoding with variable parameters for encoded blocks |

In general, many known video codecs are not able to code efficiently extensive areas of images with substantially constant parameters whilst concurrently being able to encode highly spatially detailed areas of the images. It is customary practice to employ motion compensation in a form of prediction and prediction error coding methods based upon use of transformations, for example discrete cosine transform (DCT) and wavelet transformations. These transformations employ a process wherein portions of a given image, for example a still image or an image forming a part of a video sequence, are divided into blocks which are then subject to encoding processes. The blocks are, for example, 8×8 image elements, 4×4 image elements or similar. Such relatively smaller blocks are employed because larger sizes of blocks result in inefficient encoding processes, although 16×16 image element blocks are sometimes employed. According to contemporary known approaches to image encoding, when multiple different block sizes are used for encoding, it is customary practice to utilize a small variation in block sizes; moreover, block sizes are selected based upon how well movement can be compensated in an associated block area or based upon an encoding quality parameter, for example a target quality parameter. In general, higher encoded image quality requires smaller blocks which results in less data compression. Certain types of contemporary encoding can even results in an increase in data size, when error correction features such as parity codes and error correction codes are included.

From the foregoing, it will be appreciated that providing data compression of images and videos whilst preserving image quality is a contemporary problem which is not adequately addressed by known encoders and decoders, despite a large variety of codecs having been developed during recent decades.

SUMMARY

The embodiments described herein seek to provide an encoder for encoding input data representative of at least one data content item and generating corresponding encoded output data representative of the at least one data content item, wherein the encoded output data is compressed in relation to the input data without any substantial loss of quality occurring during decoding; the data is optionally any type of data, for example at least one of: image data, video data, audio data, graphics data, economic data, mask data, multi-dimensional data (such as 3D), seismographic data, analog-to digital (ADC) converted data, biomedical signal data, textural data, text data, calendar data, mathematical data, binary data but not limited thereto. It will be appreciated that the data to be encoded can be also pre-processed, encoded or compressed data.

Moreover, the embodiments described herein seek to provide a method of encoding input data representative of at least one data content item and generating corresponding encoded output data representative of a the at least one data content item, wherein the encoded output data is compressed in relation to the input data without any substantial loss of quality occurring during encoding.

According to a first aspect, there is provided a method of encoding input data to generate corresponding encoded output data as defined in appended claim 1: there is provided a method of encoding input data to generate corresponding encoded output data, characterized in that the method includes steps of:

(a) dividing the input data into a plurality of blocks or packets, the blocks or packets having a size depending upon a nature of their data content and/or data type, and the blocks or packets being of one or more sizes;

(b) applying a plurality of transformations to content of the blocks or packets to generate corresponding transformed data;

(c) checking a quality of representation of the transformed data of the blocks or packets compared to the content of the blocks or packets prior to application of the transformations to determine whether or not the quality of representation of the transformed data satisfies one or more quality criteria;

(d) in an event that the quality of representation of the transformed data of the one or more blocks or packets does not satisfy the one or more quality criteria, sub-dividing and/or combining the one or more blocks or packets further and repeating step (b); and (e) in an event that the quality of representation of the transformed data of the one or more blocks or packets satisfies the one or more quality criteria, outputting the transformed data to provide encoded output data representative of the input data to be encoded.

The method provides efficient encoding of the input data to provide the corresponding encoded output data whilst potentially providing substantially lossless data compression of the encoded output data relative to the input data to be encoded.

Optionally, the method includes using the plurality of transformations to compress content associated with the blocks or packets, so that the encoded output data is smaller in size than the input data to be encoded.

Optionally, the method includes selecting between different types of transformations for ensuring that the one or more quality criteria are satisfied.

Optionally, the method includes arranging for the one or more quality criteria to be dynamically variable during encoding of the blocks or packets depending upon a nature of content included within the blocks or packets.

Optionally, the method is implemented such that the blocks or packets are sub-divided and/or combined so that at least one of their representative parameters describing their content is flat within their sub-divided and/or combined blocks or packets. The at least one representative parameter is, for example, color, amplitude, strength, number, or code.

Optionally, the method is implemented such that the blocks or packets correspond to a series of data, wherein sub-division of the input data corresponding to a given information to form the plurality of corresponding blocks is made dependent upon content present in one or more data preceding the given information within the temporal sequence of data.

Optionally, the method includes adding header information to the transformed data in step (e) to generate the encoded output data, wherein the header information includes information indicative of the transformations employed in step (b).

Optionally, the method is implemented such that step (b) includes fetching supplementary information from a database arrangement for use when executing the transformations, the supplementary information including at least one of: algorithms, rules, one or more transformation parameters. More optionally, the method further includes adding header information to the encoded output data indicative of the database arrangement for enabling subsequent decoding of the encoded output data to access the supplementary information when decoding the encoded output data.

Optionally, the method includes employing for the transformations one of more of: data base, DC-value, slide, scale, line, multilevel, interpolation, extrapolation, DCT, pulse code modulation (PCM), DPCM, RLE, SRLE ("Split run-length encoding", a method disclosed in U.S. Ser. No. 13/782,872 filed by Gurulogic Microsystems Oy on 1 Mar. 2013), EM ("Entropy Modifier", a method disclosed in U.S. Ser. No. 13/782,757 filed by Gurulogic Microsystems Oy on 1 Mar. 2013), LZO, VLC, Huffman-coding, arithmetic coding, range coding, transform coding, delta coding, ODelta coding (a method disclosed in U.S. Ser. No. 13/782,819 filed by Gurulogic Microsystems Oy on 1 Mar. 2013), bzip2-specific RLE, color conversion, quantization, wavelet transform, Hadamard transform, linear transform as well as the inverse methods of all mentioned. Other types of transformations are also feasible to employ for the method.

Optionally, the method includes encoding at least one of video, image, audio, graphics, economic data, mask data, multi-dimensional data (such as 3D), measurement data, text data, texture data, ECG, seismic, analog-to digital (ADC) converted data, biomedical signal data, ASCII, Unicode, calendar data, mathematical data and binary information present in the input data.

Optionally, the method includes encoding multiple channels and/or layers in the encoded output data for providing at least one of: interactive video, commercial advertisements, a plurality of viewpoints during sports event reporting, interactive watermarks, interactive pattern recognition, animated 2D/3D user interface buttons.

Optionally, the method includes transmitting the encoded data to at least one of following destinations: a data memory device, a communication network, a memory card, data memory disks, local area communication networks (LANs), directly to a decoder.

Optionally, step (a) of the method includes initially splitting the input data into one or more blocks based on at least one of:
(a) image resolutions;
(b) an amount of data;
(c) a content of data;
(d) maximum and minimum block or packet size;
(e) a quality parameter;
(f) the dynamic range of the data; and
(g) whether the data is divisible into several channels or not (e.g., multichannel audio or color channels of an image, HDR data, 3D images, videos etc.)

The splitting of input data can also include the division of data into separate channels to be processed, or the data can be processed with combined channels (if the correlation is large, and there are therefore benefits in doing so) in original format (interlaced), or by shifting the data order (progressive-to-interlaced), if the data was originally in planar format.

Optionally, the method includes utilizing only a single processing unit.

Optionally, the method includes utilizing only a single memory device.

According to a second aspect, there is provided a software product recorded on non-transitory machine-readable data storage media, wherein the software product is executable upon computing hardware for executing a method pursuant to the first aspect of the invention.

According to a third aspect, there is provided a software application for a mobile wireless communication device, wherein the software application includes a software product pursuant to the second aspect of the invention.

According to a fourth aspect, there is provided an encoder operable to encode input data to generate corresponding encoded output data, characterized in that the encoder includes data processing hardware which is operable:
(a) to divide the input data into a plurality of blocks or packets, the blocks or packets having a size depending upon a nature of their data content and/or data type, and the blocks or packets being of one or more sizes;
(b) to apply a plurality of transformations to content of the blocks or packets to generate corresponding transformed data;
(c) to check a quality of representation of the transformed data of the blocks or packets compared to the content of the blocks or packets prior to application of the transformations to determine whether or not the quality of representation of the transformed data satisfies one or more quality criteria;
(d) in an event that the quality of representation of the transformed data of the one or more blocks or packets does not satisfy the one or more quality criteria, to sub-divide and/or to combine, if it improves compression efficiency and does not deteriorate reconstruction significantly, the one or more blocks or packets further and repeating step (b); and
(e) in an event that the quality of representation of the transformed data of the one or more blocks or packets satisfies the one or more quality criteria, to output the transformed data to provide the encoded output data representative of the input data to be encoded.

Optionally, the encoder is implemented such that the data processing hardware is implemented using computing hardware operable to execute a software product. More optionally, the data processing hardware includes a plurality of processors which are operable to process data in parallel, and the encoder is operable to direct concurrently block and/or packet data to the plurality of processors for encoding to data to be included in the encoded output data.

It is to be noted that the possibility to use plurality of processors is different from the issue of processing unit. Namely, the encoder pursuant to the invention has only one processing unit as opposed to many prior art solutions which have two separate processing units (analysis unit and encoder), and thus also a plurality of memories. The method pursuant to this invention is a completely independent method and integrated solution which transmits parameters to the decoder at once, without the need for a preliminary pre-processing unit (i.e., not first from some analysis part to the encoder, and then to the decoder). The integrated solution also enables optimizing of memory bandwidth and memory capacity, because the input data needs to be transferred to the encoder only once, as opposed to a 2-part solution used by the prior art methods where the analysis processor and encoder receive their data separately from the image source. In the 2-part prior art solutions, both the analysis part and the encoder have their own memories where the input data is stored, whereas the integrated solution pursuant to the invention only requires one memory which leads to significant savings in both memory bandwidth and memory capacity.

Optionally, the encoder is operable to select between different types of transformations for ensuring that the one or more quality criteria are satisfied.

Optionally, the encoder is operable to use the transformations to compress content associated with the blocks or packets, so that the encoded output data is smaller in size than the input data to be encoded.

Optionally, the encoder is operable to arrange for the one or more quality criteria to be dynamically variable during encoding of the blocks or packets depending upon a nature of content included within the blocks or packets.

Optionally, the encoder is operable to sub-divide and/or combine the blocks or packets so that at least one of their representative parameters describing their content is flat within their sub-divided/combined blocks or packets. More optionally, the encoder is implemented such that the at least one parameter corresponds to a color, amplitude, strength, number, or code of the sub-divided/combined blocks.

Optionally, the encoder is implemented such that the blocks or packets correspond to a series of data, wherein sub-division of the input data corresponding to a given information to form the plurality of corresponding blocks is made dependent upon content present in one or more data preceding the given information within the temporal sequence of data.

Optionally, the encoder is operable to add header information to the transformed data to generate the encoded output data, wherein the header information includes information indicative of the transformations employed by the encoder.

Optionally, the encoder is operable to fetch supplementary information from a database arrangement for use when executing the transformations, the supplementary information including at least one of: algorithms, rules, one or more transformation parameters. More optionally, the encoder is operable to add header information to the encoded output data in a manner indicative of the database arrangement for enabling subsequent decoding of the encoded output data to access the supplementary information when decoding the encoded output data.

Optionally, the encoder is operable to employ for the transformations one of more of: data base, DC-value, slide, scale, line, multilevel, unchanged, interpolation, extrapolation, DCT, pulse code modulation (PCM), DPCM, RLE, SRLE, EM, LZO, VLC, Huffman-coding, arithmetic coding, range coding, transform coding, ODelta coding, color conversion, quantization, wavelet transform, Hadamard transform, linear transform as well as the inverse methods of all mentioned. Other types of transformation are optionally employed by the encoder.

Optionally, the encoder is operable to encode at least one of video, image, audio, graphics, text, ECG, seismic, ASCII, Unicode, and binary information present in the input data to be encoded.

Optionally, the encoder is implemented to transmit the encoded data to at least one of following destinations: a data memory device, a communication network, a memory card, data memory disks, local area communication networks (LANs), directly to a decoder.

Optionally, the encoder includes a single processing unit.

Optionally, the encoder includes a single memory device.

According to a fifth aspect, there is provided an electronic consumer product operable to transmit and/or store input data, characterized in that the electronic consumer product includes an encoder pursuant to the fourth aspect for encoding the input data.

Optionally, the electronic consumer product is at least one of: a mobile telephone, a cell phone, a tablet computer, a tablet computer, a personal computer, a television, a portable media playing device, cameras, editors, transcoders, scanners, a fax, a copy machine, microphones, audio cards, record players, DVD players etc.

It will be appreciated that features of the invention are susceptible to being combined in various combinations without departing from the scope of the invention as defined by the appended claims.

BRIEF DESCRIPTION OF THE DRAWINGS

Embodiments of the present disclosure will now be described, by way of example only, with reference to the following diagrams wherein.

Figure 1:
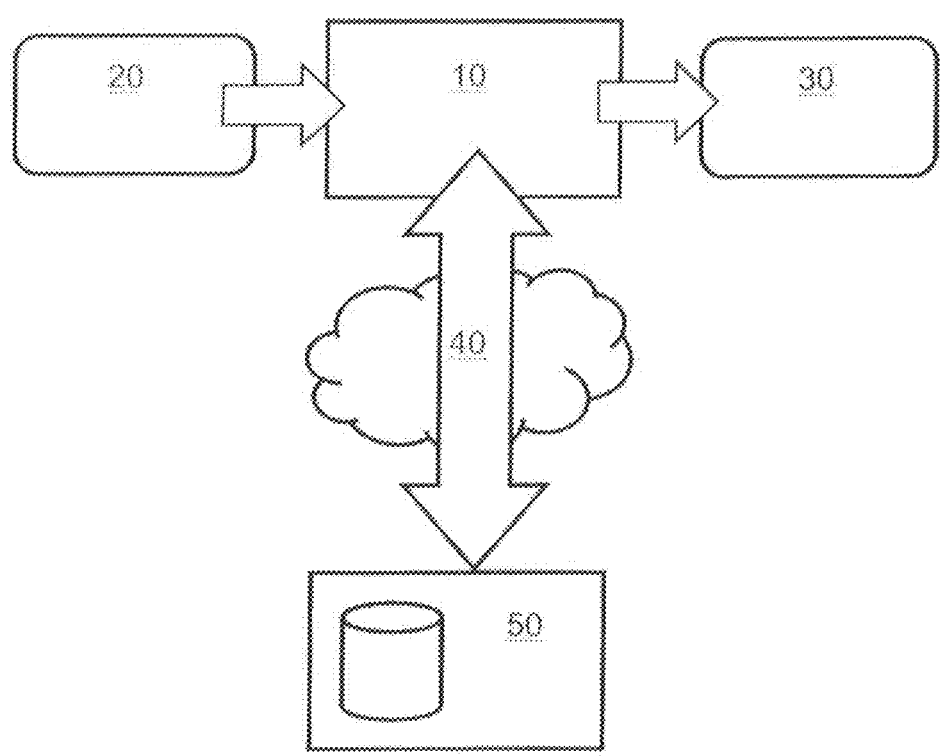
FIG. 1 is a schematic illustration of an embodiment of an encoder.

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

In overview, the embodiments are concerned with encoders and associated methods of encoding input data to generate corresponding encoded output data.

The methods are concerned with receiving input data representative of e.g. one or more images and/or one or more audio signals, and then processing the input data in a manner corresponding to at least one of:
(a) partitioning each image into blocks which can be of variable size;
(b) partitioning the one or more audio signals into packets which can be of variable size;
(c) sub-dividing and/or combining blocks of images to form smaller and/or larger blocks which can be of variable size which are more favorable to encode; and
(d) sub-dividing and/or combining packets of one or more audio signals to form divided and/or combined packets which are more favorable to encode.

Moreover, the method includes processing the blocks and/or packets to generate compressed encoded output data representative of the one or more images and/or the one or more audio signals.

The method is capable of employing multiple coding and entropy modifying methods, namely transformations, when coding and compressing data describing blocks of data. For example, different transformations are used for different blocks of a given image, when favorable coding and compression performance is thereby achieved, depending upon information content of the different blocks. Optionally, RD optimization is employed as a quality criterion when processing the blocks of data. RD optimization will be described in greater detail later.

Information regarding the splitting/combining is communicated with the data, either in header or in the encoded output data. The information can contain bits to express individual splitting/combining decisions. Further, because the split/combine decisions enable segmentation, which defines the area identifiers for the blocks (i.e. the size, location and shape of each block), then this information can also be conveyed and transmitted e.g. with x and y coordinates, which would specify the sizes and locations of the blocks (and maybe even their shapes). When using x and y coordinates to transmit the split/combine information, it would be beneficial to delta code those x and y coordinate values separately. It will be appreciated that in addition to the aforementioned examples, there are also other ways to convey and transmit the size, location and shape of each block, gained from the split/combine decisions.

Information describing the plurality of transformations employed when coding the blocks is communicated in the encoded output data; this information is either intrinsically included in the encoded output data, or the output data includes a reference to one or more databases for where information describing the transformations utilized can be obtained. Coding methods that are employed can include one or more of: multilevel, line, scale, slide, interpolation, extrapolation, unchanged, motion estimation, SRLE, EM, Odelta and range coding, as will be elucidated in greater detail later. Optionally, splitting of Init-blocks is also employed. This can be done separately for each channel or for multiple or all channels simultaneously.

Selection of the sizes of the blocks is determined by an ease with which areas corresponding to the blocks can be encoded; for example, larger blocks are employed for areas of the one or more images which have a substantially constant associated parameter value, and smaller blocks are employed for areas of the one or more images which are difficult to encode on account of relatively abrupt spatial changes in associated parameter values for the areas. The parameters optionally pertain to one or more of: color, illumination, sliding parameter value, repetitive pattern, but not limited thereto. Easy encoding corresponds, for example, to at least one parameter associated with a given area being substantially constant within the given area. Moreover, the method also employs larger blocks for stationary areas in video sequences of images, or to groups of areas in the video sequences of images that are moving similarly, namely blocks which correspond to fixed objects. The blocks are optionally rectilinear in relation to areas of the one or more images which they represent, for example 64×64 elements, 32×16 elements, 4×20 elements, 10×4 elements, 1×4 elements, 3×1 elements, 8×8 elements, 1×1 element and so forth; optionally, the elements correspond to pixels present in the one or more images, but can be subject to scaling operations during encoding, namely each element corresponding to a corresponding plurality of pixels. However, other shapes of blocks are optionally employed, for example elliptical blocks, circular blocks, triangles and so forth. Moreover, by analogy, the method can also be applied to encode one or more audio signals, wherein the one or more audio signals are subdivided into packets, and/or combined into packets, of variable temporal length, depending upon a nature of the audio signals corresponding thereto, and the packets are then encoded to generate encoded compressed output data; the packets are synonymous with aforesaid blocks but pertain to audio rather than images information. Encoders pursuant to the present invention are capable of concurrently encoding both audio information and image information as well as any other type of data.

The degree of variation in the content of data can be measured by calculating e.g. the variance, the standard deviation, maximal and minimal values of amplitude, etc. If for example the variance is used as the meter, then it is beneficial to first divide the data in such a fashion that the less variation there is in the data and therefore the smaller the variance value is, the larger the resulting blocks should be. Vice versa, with more variance, i.e. with a lot of variation in the content, it is beneficial to divide data to smaller blocks. This can also be performed so that at first, data is divided into larger blocks, after which those blocks will be analysed further. In case there is lot of variance in the content of some of the large blocks, then those large blocks will be divided to smaller blocks based on variance in the content. However, this division always needs to be communicated from the encoder to the decoder, so that the decoder knows what was e.g. the standard deviation before decoding the data.

However, it is much more effective to divide the data already in the very beginning to smaller blocks and then to start combining them than to start with larger blocks and then to continue to divide them to smaller and smaller blocks, as it is probable that some splitting of blocks into smaller blocks will take place later anyway. Also, the quality parameter can have an effect on the initial division, that is, the better quality result is to be gained, the smaller initial blocks it is worth creating and vice versa.

During processing of the areas of the one or more images into corresponding blocks, the method includes checking a quality of representation of information provided by the blocks relative to corresponding detail in the one or more images to compute a corresponding quality index; in an event that the computed quality index indicates, when compared against a reference quality threshold, that a selection of block sizes has been employed such that the quality of representation of data provided by the blocks is insufficient, the method iterates back and uses progressively smaller blocks, and/or combines various blocks together, if it improves the compression efficiency and does not deteriorate the reconstruction significantly, until the quality index indicates that the quality of representation is met as defined by the reference quality threshold. By such an approach, it is feasible, pursuant to the present invention, to achieve data compression during encoding which is substantially lossless, depending upon choice of threshold value for the quality of representation of information. Optionally, the reference quality threshold is made dynamically variable, depending upon content present in the one or more images; for example, when the one or more images are a part of video sequence where there is rapid chaotic activity, the reference quality threshold can be relaxed during the chaotic activity for enabling an enhanced degree of data compression to be achieved. The chaotic activity can be, for example, random features such as flowing turbulent water, flames, falling snow, billowing smoke, ocean waves and so forth, wherein loss of information is not readily discernible when the encoded data is subsequently decoded in a decoder.

Determination of blocks in the aforesaid encoder can be optionally based upon one or more criteria as listed in Table 3.

TABLE 3

Split selection and/or combining selection of blocks during image encoding

| Criterion number | Criterion |
|---|---|
| 1 | Variance or standard deviation of block data as derived from a corresponding area of an input image |
| 2 | Mean or sum of an absolute difference between data represented by a given block and a prediction of its value |
| 3 | Variance or standard deviation of an absolute difference between data represented by a given block and a prediction of its value |

Optionally, predictions in Table 3 are based upon known rules employed when encoding one or more images. Alternatively, the predictions in Table 3 are based upon provided configuration information, for example as provided from selected database references, from prediction directions, from movements of block coordinates within the one or more images, and so forth. A use of a variance or a standard deviation is an approach employed pursuant to the present invention to provide compression of information by describing a mutual relationship of elements included within a given corresponding block. In many situations, predictions of block data with associated encoding is itself sufficient when performing encoding pursuant to the present invention, but it is optionally desirable to include code prediction error data within the prediction to improve an accuracy of the prediction. In a simple embodiment of the present invention, a simple data prediction method is employed, for example a mean value, namely "DC" value, of pixels or elements within a given block to be delivered in the encoded output data.

Splitting areas, alternatively combining areas, of one or more images provided as input data to an encoder implementing the aforesaid method is optionally implemented according to any manner which provides both compression and also substantially maintains image quality, namely is substantially lossless during encoding. The method applies various strategies to such splitting and/or combining of areas. For example, if a given block includes considerable information, it is optionally split into a plurality of corresponding smaller blocks that are relatively "flat", alternatively optionally combined into larger blocks that are relatively "flat", namely substantially constant, in relation to their content such that they individually include relatively little information. When the encoding method pursuant to the present invention is applied to at least one or more images and/or one or more audio signals, encoding quality and encoding noise in the encoded output data are optionally employed to control a manner in which splitting up of input images and audio input signals into blocks and packets respectively occurs. However, it will be appreciated that other types of data content items can be processed in a similar manner, for example at least one of: image data, video data, audio data, graphics data, economic data, mask data, multidimensional data (such as 3D), measurement data, seismographic data, analog-to-digital (ADC)

converted data, biomedical signal data, text data, textural data, calendar data, mathematical data, binary data but not limited thereto.

It will be appreciated that the actual splitting can take place in various forms and directions, such as diagonally, horizontally, vertically etc. As a result of splitting 1 . . . N sub-blocks are created. The sub-blocks can be of the same or of different size. Furthermore, the sub-blocks can be of the same shape or of different shape. The size or shape does not matter as long as the encoder and the decoder can function in a similar way, with or without related additional information transmitted to them.

Optionally, the noise in the encoded output data is based on at least one of:
(i) noise present in a present block or packet;
(ii) noise present in one or more previous blocks or packets generated by the method; and
(iii) previous images.

Optionally, when a given input image is split into areas and corresponding blocks, the method analyses the blocks thereby generated to determine whether or not any of the blocks can be combined together, as aforementioned, subject to aforesaid quality criteria, in order to obtain a greater degree of data compression in the encoded output data. In the foregoing, the encoded output data includes information associated with the blocks which defines locations of their corresponding areas in their original images in the input data to be encoded.

When encoding the one or more images present in the input data to be encoded using the method, data associated with the input images can be either quantized or down-sampled so as to achieve compression benefits. Quantization reduces the dynamic range of the samples (or the transformation values), and it is executed for every sample (or transformation value) separately, whereas downsampling refers to decreasing the sampling rate, i.e., less samples are taken from a block of data. These methods are therefore related, but not the same.

For example, the data can be down-sampled in ratios of 2×1:1, 2×2:1, 1×2:1, 4×1:1, or similarly quantized prior to being subject to aforementioned encoding methods. Optionally, such down-sampling or quantizing is performed in response to a desired quality of encoding desired in the compressed encoded output data generated from applying methods pursuant to the present invention. Optionally, larger blocks processed by the methods are less downsampled or quantized than smaller blocks; in other words, a degree of quantization or downsampling employed is optionally decreased as block sizes are increased. Optionally, during encoding, a scaling factor for down-sampling or quantization employed, is made dynamically variable, for example in response to a nature of content in a sequence of images, for example video, to be encoded.

During encoding of blocks pursuant to the method, each block has various parameters which describe its contents. These parameters are conveyed when encoding via various "channels". For example, color channels describing blocks of an image can include one or more of: black/white (B/W), Y, U, V, red (R), green (G), blue (B), Cyan (C), Magenta (M), Y and K. Moreover, the input images for encoding and the blocks can be optionally processed when executing the methods using a variety of potential color or pixels formats, for example Y, YUV420, YUV422, YUV444, RGB444, G and CMYK contemporary standards and formats. Moreover, the format is optionally planar, interleaved line planar and so forth. Moreover, the methods of the invention are capable to change format of images and/or blocks as well as to combine or separate channels when performing encoding activities; for example, an original image is in an interleaved RGB format and is encoded using methods pursuant to the disclosure to generate encoded output data in YUV420 format or vice versa. It will be appreciated that changing the format and combining or separating channels can be performed also for audio data, as well as for other types of data.

Bit depth, namely dynamic range of a pixel when implementing the aforesaid encoding method, can be in a range of 1-bit to 64-bit resolution. Optionally, different pixel color or audio channels can be encoding with mutually different resolutions, provided that encoding quality criteria and compression performance of the encoding methods is satisfied.

The encoding methods pursuant to the present disclosure are optionally implemented using encoding parameters and encoding rules and/or tables which are stored on a database and which are accessed when performing encoding activities. Optionally, the database is creating during the encoding process and delivered for use when implementing the method via an encoder. For example, motion compensation during encoding ican be implemented using delivered databases of information to the encoder. The encoder is operable to encode original pixel information present in the input data and/or encode prediction error information. Using database information when encoding input data to generate corresponding encoded output data enables the encoder to adapt to revisions in encoding standards of parameters, tables and similar utilized for encoding. Coding approaches which can be adopted when implementing the encoding methods pursuant to the present invention optionally include one or more of: data base, DC-value, slide, scale, line, multilevel, unchanged, interpolation, extrapolation, DCT, pulse code modulation (PCM), DPCM, RLE, SRLE, EM, LZO, VLC, Huffman-coding, arithmetic coding, range coding, transform coding, delta coding, ODelta coding, bzip2-specific RLE, wavelet transform, Hadamard transform, linear transform and inverse methods of all mentioned but not limited thereto. Optionally, the coding approaches including any combination of aforementioned examples of coding, namely a plurality of encoding transformations are beneficially employed, as well as a plurality of parameters, for blocks and/or packets, depending upon information content of the blocks and/or packets. When a coding approach such as Huffman encoding is employed, such coding uses fixed tables of encoding parameters or delivered tables of coding parameters. The encoder is implemented using computing hardware having data storage arrangements, wherein optimized tables of encoding parameters can be stored in the data storage arrangements for future use when performing encoding operations. Reference addresses for enabling a decoder to access databases for obtaining suitable parameters for decoding the encoded output data from the encoder are included in the encoded output data. Optionally, the databases are accessible via a communication network, for example via Internet. Optionally, the databases are supported via cloud computing arrangements. When the method implemented in the encoder utilizes mathematically generated databases, the databases can optionally be DC value, 1D/2D-linear transition, 1D/2D-curved transition, a 1D/2D transformation function or some known image block or audio packet structure.

The method of encoding pursuant to the present disclosure when executed on an encoder is operable to encode input data to generate encoded output data, wherein the encoded output data can be output as a bit stream, alternatively stored in data storage media, for example as a data file. Moreover, the method of the invention is capable of being utilized in a range of possible applications; beneficially, a header for video, image, image block, audio or audio packets beneficially includes supplementary information, such as version number, size of data for the video, image or packet, quality factor threshold employed when encoding, maximum block or packet size, encoding approaches applied, namely types of transformations employed, tables of encoding parameters, and any other information for assisting subsequent decoding processes. Optionally, information that does not vary between blocks is not included for obtaining an enhanced degree of data compression in the encoded output data, or is included at a higher level in the encoded output data, for example at header or sub-header level. Table 4 provides a hierarchical order of levels which can be employed in the encoded output data generated by the encoder.

TABLE 4 order of levels in encoded output data, from high to low

| Level order | Information associated with level |
|---|---|
| High | Video |
| | Groups of images |
| | Image |
| | Groups of macro blocks |
| Medium | Macro blocks |
| | Groups of blocks |
| | Block |
| | Groups of microblocks |
| Low | Microblocks |

Optionally, the method of encoding pursuant to the present invention is operable when executed to select and to deliver information pertaining to one or more levels in the encoded output data, for example dependent upon field of application of the method, for example consumer video products, professional image compression apparatus for survey use, X-ray imaging apparatus, magnetic resonance imaging (MRA) apparatus. Similar considerations pertain to orders of levels in encoded output data when the method pursuant to the present invention is employed to encode audio data; there can be employed headers for audio, groups of packets, packets, sub-packets, groups of waveform segments, and waveform segment.

It should be appreciated that the method has been designed to encode data in such a way that it is given to the method, i.e. with the given parameters. However, nothing prevents using the sub-methods of the main method, i.e. the transformations, to format and encode the data in several phases iteratively, in such a way that as a result of some sub-method/transformation the generated residual shrinks smaller and smaller by each iteration, and may even vanish. However, it would be advantageous if every block could be processed with one single sub-method/transformation, in which case there should be sufficient amount of different sub-methods/transformations available, in order to avoid re-transforming the residual. The input data can be original data, pre-processed data or residual data, but the method produces only the encoded output data. This encoded data can later be decoded into a similar format as the input data given to the encoder was. Therefore, if the given input data was already processed data or residual data, then the possibly needed counter-operations are no longer responsibility of the method, but of the system using the method. After all, the method was primarily developed to implement the entire coding solution, and therefore, beneficially, the given input data is original data, and not for example prediction error generated by motion estimation or intra-prediction, for some data block. Motion estimation or intra-prediction could be used as a sub-method/transformation in this method, but in such a case, it would be beneficial if they would not yield a significant residual, so that their residual would not have to be re-transformed, with new transformations.

Referring to FIG. 1, there is shown an illustration of an encoder pursuant to the present disclosure. The encoder is denoted by 10 and is operable to receive input data 20 and to encode the input data 20 by employing an encoding method pursuant to the present disclosure to generate corresponding encoded compressed output data 30. The output data 30 is encoded in a substantially lossless manner as aforementioned. Optionally, the encoder 10 is coupled via a communication network 40 to a database arrangement 50 whereat one or more parameters, tables and/or rules for encoding the input data 20 are stored.

In operation, the encoder 10 receives the input data 20, optionally derives encoding information from the database arrangement 50 via the communication network 40, and then proceeds to encode the input data 20 to generate the encoded compressed output data 30. Optionally, the input data 20 includes at least one of: audio, one or more images, video, graphics, economic data, mask data, multidimensional data (such as 3D), text, texture, multidimensional data, ECG, seismic, measurement data, ASCII, Unicode, and binary data but is not limited thereto. Optionally, the encoded output data 30 includes headers, encoding information as well as encoded data. The output data 30 can be streamed from the encoder 10, for example for communication via a communication network arrangement to one or more data storage devices or decoders, or stored directly onto machine-readable data storage media, for example server hard drive disk storage, portable solid-state memory devices and so forth.

The encoder 10 can be implemented as hardware, for example via one or more PGLA (Programmable Gate Logic Array), via one or more software application executable upon computing hardware, or any mixture of hardware and software, for example a parallel processing engine. The encoder 10 can be employed in multimedia products, computers, mobile telephones ("cell phones"), Internet services, video recorders, video players, communication apparatus and similar. The encoder 10 is optionally employed in conjunction with image capture systems, for example surveillance cameras, hospital X-ray systems, hospital MRI scanners, hospital ultrasound scanners, aerial surveillance systems and similar apparatus which generate large quantities of image data wherein lossless compression is desired so as to preserve fine information in the images whilst rendering the quantities of image data manageable for data storage purposes.

The encoder 10 can be used with known apparatus for image processing, for example in conjunction with an image/video processor as described in a published US patent application no. US2007/280355 herewith incorporated by reference, for example in conjunction with an image generator as described in a published US patent application no. US2010/0322301 herewith incorporated by reference, and for example with a pattern recognizer as described in a published US patent application no. US2011/007971 herewith incorporated by reference.

Figure 2:
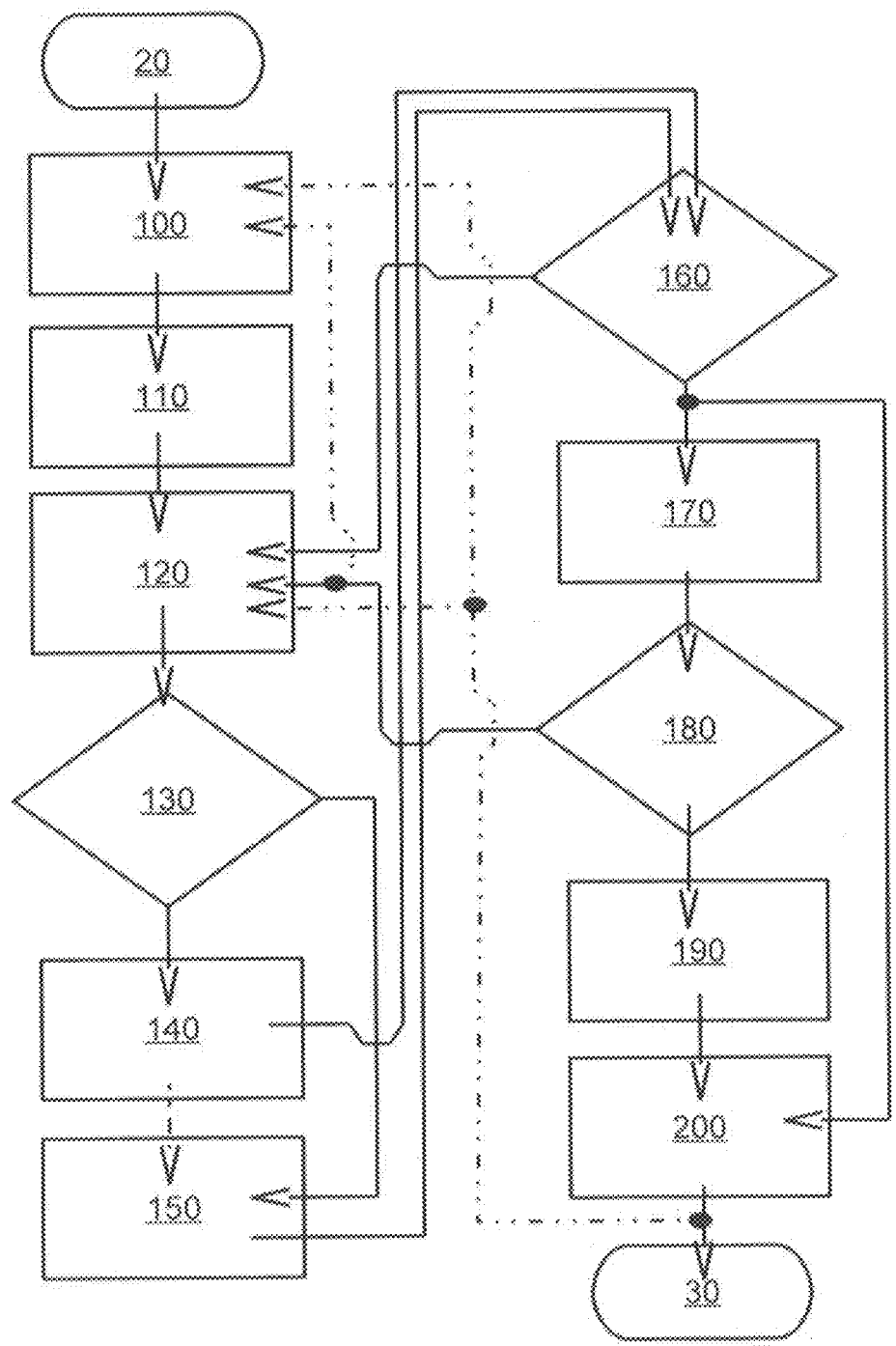
FIG. 2 is a flow chart of steps of a method of encoding input data representative of at least one data content item to generate corresponding encoded output data, wherein the encoded output data is compressed relative to the input data without substantial loss of quality occurring during encoding; the data content item can include at least one of: image data, video data, audio data, graphics data, multidimensional data (such as 3D), economic data, mask data, measurement data seismographic data, analog-to-digital (ADC) converted data, biomedical signal data, text data, textural data, calendar data, mathematical data, binary data but not limited thereto.

A method of encoding input data using the encoder 10 of FIG. 1 will now be described with reference to FIG. 2. In FIG. 2, steps of a method of encoding input data 20 are denoted by 100 to 200. In a first step 100, the method includes receiving input data for blocks, image, video and/or audio, but not limited thereto, for example for receiving the aforesaid input data 20; image/block type, image/block format information is derived at the first step for inclusion in the encoded output data 30. The first step 100 is capable of providing writing header information, for example image size information, into the encoded compressed data.

In a second step 110, executed after the first step 100, the method includes creating, if needed, initial blocks or packets. In a third step 120, executed after the second step 110, the method includes performing an analysis of block and/or packet information generated by the second step 110. In a fourth step 130, executed after the third step 120, the method includes determining whether or not one or more blocks and/or packets identified in the third step 120 need to be split and/or combined, for example for achieving a defined quality of encoding and/or defined compression ratio, namely substantially lossless encoding; in an event that one or more blocks or packets are found to need splitting and/or combining in the fourth step 130, the method proceeds to a fifth step 140 in which the one or more identified blocks or packets are split into smaller blocks or packets, and/or are combined into larger blocks or packets, thereby creating additional new blocks or new packets; in an event that one or more blocks or packets are not required to be split and/or combined in the fourth step 130, the method proceeds to a sixth step 150. On completing the fifth step 140, when appropriate, the method proceeds to the sixth step 150.

In the sixth step 150 the data of the blocks reconstructed by the transformations based on the analysis executed in the step 120 is outputted to data streams, after which the method proceeds further to a seventh step 160.

In the seventh step 160, the method includes determining whether or not a last block or packet has been reached which is to be encoded; in an event that there are blocks or packets remaining to be encoded, the method includes returning back to the third step 120 of performing the analysis of block or packet information; in an event that all the blocks or packets have been encoded, the method includes proceeding to an eighth step 170. The eighth step 170 of the method includes compressing and encoding data, for example pixel values, parameters and split information, for example using RLE, Huffman, DCT or similar transformations, and writing header information as aforementioned; for example, if DC values of the blocks are sent, they can be firstly optionally delta-encoded, and thereafter corresponding delta-encoded values encoded as RLE and then these encoded using Huffman encoding. When compression and encoding activities in the eighth step 170 have been completed, the method includes proceeding to a ninth step 180 which is concerned with checking whether or not a last initial block, packet or frame has been reached; in an event that the last initial block, packet or frame has not been reached, the method includes returning to the third step 120; in an event that the last initial block, packet or frame has been reached, the method includes proceeding to a tenth step 190. In the tenth step 190, the method includes performing one or more analyses whether or not image/blocks are, for example, similar to previous image/blocks or, for example black in color. Such analysis optionally also needs some information that can be obtained from one or more of the previous steps. This step enables images/blocks of the encoded output data to be more compressed. Similar analysis that does not need any information from one or more of the previous steps are also executed already in the third step 120, and then it is also possible to avoid unnecessary processing to be executed in the processor. After completing the tenth step 190, the method includes proceeding to an eleventh step 200, wherein the method includes applying end encoding of block, packet, image or video to finalize the encoded compressed output data 30. Optionally, the method includes progressing from the seventh step 160 directly to the eleventh step 200 if applicable, for example only one block in the image is needed to be encoded and it is, for example, black or similar than the previous block in the previous image. All the encoded data that can be written to a file or streamed out is beneficially generated as early as possible to avoid extra buffering when implementing the method.

Figure 3A:
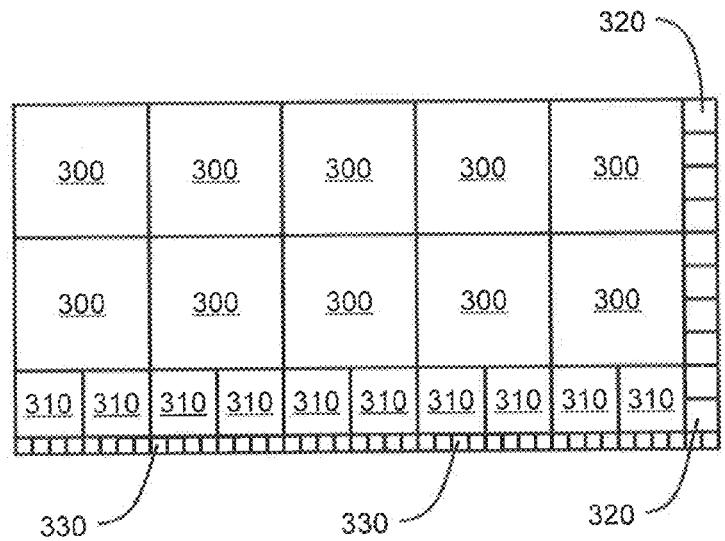
FIGS. 3A, 3B, 3C and 3D represent different initial block splitting strategies, i.e. strategies for partitioning an image into areas corresponding to blocks for encoding, using a method whose steps are illustrated in FIG. 2.

Referring next to FIG. 3A, from the foregoing, it will be appreciated that the method of encoding pursuant to the present disclosure employs, when appropriate, variable block or packet size for providing an optimal solution between data compression in the encoded output data 30 and substantially lossless compression, namely substantially without discernible loss. In FIG. 3A, large coding blocks 300 are employed for an upper left hand corner of a given image, whereas smaller blocks 310, 320, 330 are required along right-hand-side and lower edge areas of the image for more accurately providing encoding of these areas. In the encoded output data 30, parameters describing image content of the blocks 300, 310, 320, 330 and the position of the blocks within the image are included in the encoded output data 30. Encoding methods employed for encoding the blocks 300, 310, 320, 330 are also defined in the encoded output data 30, for example different methods for different blocks 300, 310, 320, 330. The distribution of the blocks 300, 310, 320, 330 will vary depending upon spatial distribution of content within images to be encoded.

The FIG. 3A shows an example of the initial split of blocks in the image that is generated in the second step 110. This initial split of blocks does not require any additional information to be sent between encoder and decoder, because it can be based, for example, upon a size of the image. According to an embodiment, when a real split of block is executed in the fifth step 140, then that information may be delivered from the encoder to the decoder, in different manners described earlier. A practical example on encoding an image is described later.

Figure 3B:
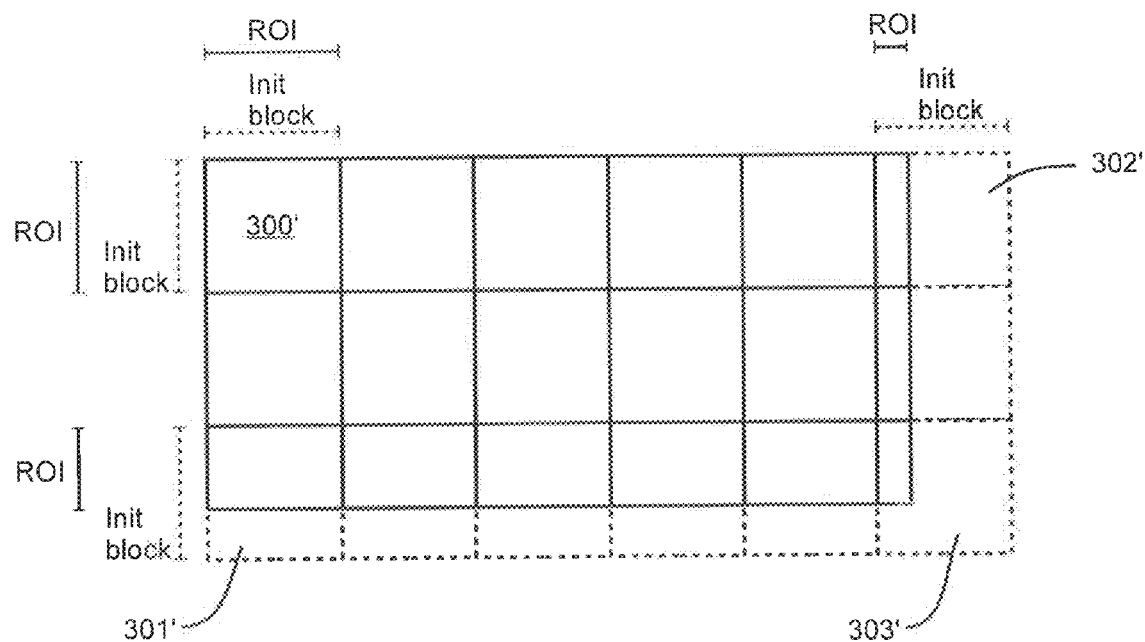
Figure 3C:
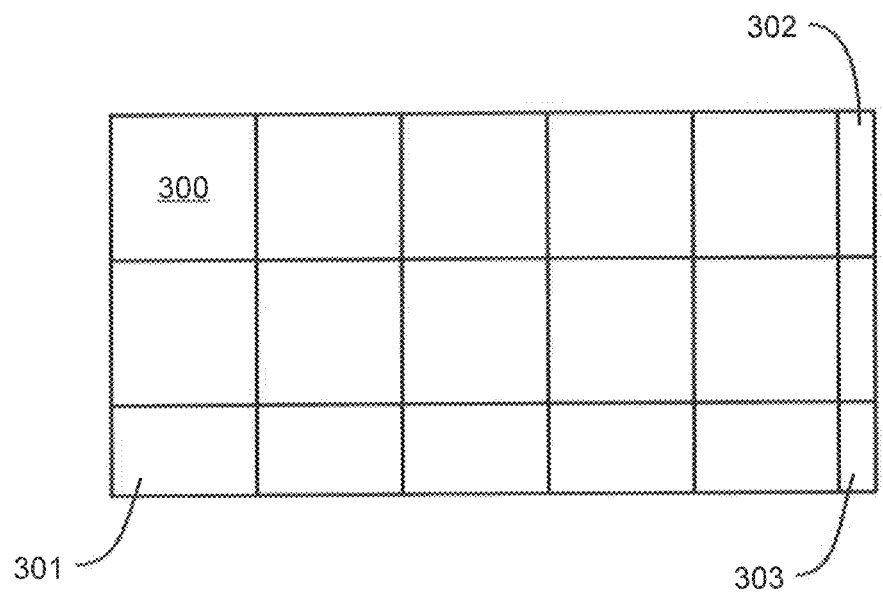
Figure 3D:
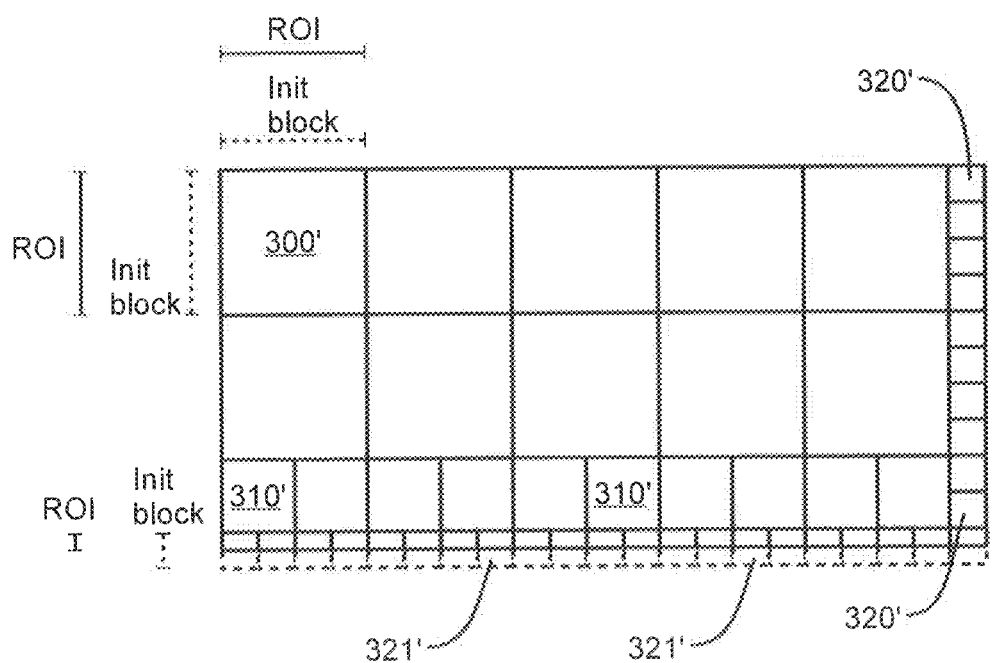

Figures FIG. 3A, FIG. 3B, FIG. 3C and FIG. 3D represent different initial split solutions for different needs. The solution can be either pre-defined so that the encoder and decoder know the selected initial split solution or encoder can select the solution and then communicate that information to the decoder. The communication can contain information as to whether the resulting blocks are of equal or variable size, rectangular or non-rectangular, and whether ROI has been used. In FIG. 3B, all the blocks are equal-sized, but for the edge blocks 301', 302', 303' the Region of Interest (ROI) defines which areas contain actual (image) data. FIG. 3C is formed out of the FIG. 3B in such a way that a ROI is not used any more, but in addition to square blocks, non-square rectangle blocks are used as well. In FIG. 3D the blocks are square, the maximum and minimum size is defined, and ROI is used at the edge.

Figure 3E:
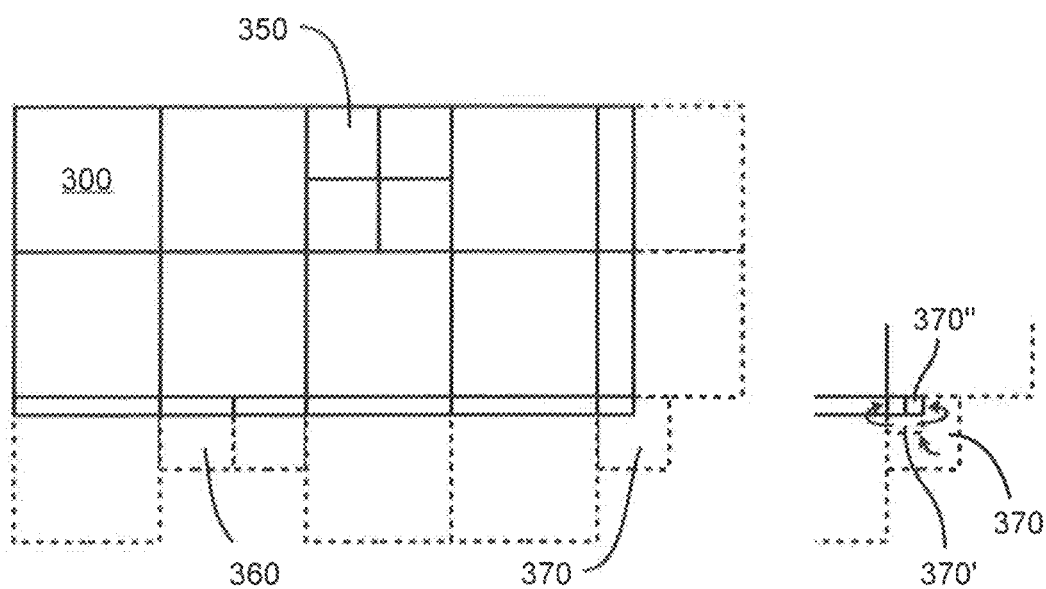
FIG. 3E represents first split examples executed for a FIG. 3B type split.

FIG. 3E presents the first division of three blocks after the initial split. Typically, a Region of Interest (ROI)=block, in which case the block 300 is split into blocks 350, as FIG. 3E illustrates. A block where the ROI is smaller than the block size is split into two new blocks 360, which then include a new ROI. When a block that contains a ROI is split, the resulting blocks do not necessarily contain a ROI which is of different size than the entire post-split block. However, in the case of the 360 block, the post-split blocks contain also a ROI that is not the same size as the entire block. It should be noted that those two blocks that remained outside the ROI are omitted. As regards block 370, only one block remains after the split, because other sub-blocks did not contain valid image data.

It is also favorable to construct an implementation where the result of a block split is at least two blocks. In such an implementation, when a split decision is made, the splitting (370, 370', 370") is continued iteratively until the result contains more than one block, as can be seen in the small sub-figure of FIG. 3E.

In the foregoing, the following abbreviations have been used as given in Table 5. These various encoding formats are all potentially relevant for use when implementing the encoder 10, depending upon desired performance of the encoder 10.

Referring again to FIG. 2, it will be appreciated that the method of encoding optionally completes encoding of at least one of images, video and audio, and then thereafter outputs the encoded output data 30. Alternatively, by way of a link after step 200 in FIG. 2 back to step 100 or 120, enables the encoded output data 30 to be output, for example streamed, concurrently with the method executing encoding steps on at least of images, video and audio. Such operation is beneficial when the method of the present invention is employed to encode source data at a server site in real time for streaming to customers, for example for Internet-delivered multimedia services. The method is potentially thereby capable of functioning with small data storage capacity available, and user interruption of streamed encoded data, for example by the user selecting an alternative, avoids an entire video file being encoded when not required by the user, thereby saving computer processing resources. Such considerations are very important for contemporary multimedia streaming services operating via Internet for example.

When sending the encoded output data 30, for example in a concurrent encoding/streaming situation as aforementioned, typically highest level headers are sent first and thereafter encoded data related to a highest level of hierarchy, whereafter encoded data relating to lower levels of hierarchy are sent. For example, in the encoded output data 30, image size data and image/video related data are sent first in the encoded output data 30, and thereafter information relating to splitting/combining of blocks, and thereafter algorithms utilized in block encoding and encoded block data are sent.

The encoder 10 can be implemented using computing hardware including a parallel processor architecture including a plurality of processors organized to process data in parallel. For example, on account of initial block splitting to provided the split blocks 300, 310, 320, 330, the split blocks 300, 310, 320, 330 can be distributed the plurality of processors, for example a first processor encoding the blocks 300, 310, 320 and a second processor encoding the blocks 330.

During encoding, the number of channels employed by the encoder 10 to encode images, video and/or audio can be dynamically variable, for obtaining a greater degree of data compression in the encoded output data 30. For example, it is convenient to employ up to four channels, although images can include multiple layers that can be presented together. The layers optionally pertain to one or more of: subtitles, logos, multi-view images, depth. Moreover, the layers optionally convey mutually different volumes of data. All associated layer data are encoded in the encoded output data 30 as separate channels, and an associated description regarding how the channels should be combined and used is also included in one or more headers included in the encoded output data 30.

TABLE 5

Abbreviations for encoding transformations useable when implementing embodiments of the present disclosure

| | |
|---|---|
| 1D | 1-Dimensional (e.g. for a signal or packet) |
| 2D | 2-Dimensional (e.g. for a block, image, stereo or multichannel audio) |
| 3D | 3-Dimensional (e.g. for video, stereo image, multichannel image) |
| AAC | Advanced Audio Coding |
| AVC | Advanced Video Coding |
| BMP | Bitmap - file format |
| DC | Direct Current |
| DCT | Discrete Cosine Transform |
| DPCM | Differential Pulse Code Modulation |
| FLAC | Free Lossless Audio Codec |
| GIF | Graphic Interchange Format |
| JPEG | Joint Photographic Experts Group |
| JPEG XR | JPEG eXtended Range |
| LZO | Lempel-Ziv transform based coding method |
| MAD | Mean Absolute Difference |
| MP3 | MPEG-1 audio layer 3 |
| MPEG | Motion Picture Experts Group |
| MSD | Mean Square Difference |
| MVC | Multiview Video Encoding |
| PCM | Pulse Code Modulation |
| PNG | Portable Network Graphics |
| RLE | Run-Length Encoding |
| SAD | Sum of Absolute Differences |
| SSD | Sum of Square Differences |
| TIFF | Tagged Image File Format |
| VLC | Variable Length Coding |
| VQ | Vector Quantization |
| EM | Entropy Modifier |

It will be appreciated that the splitting of blocks illustrated in FIG. 3 is merely an example. In a temporal sequence of images, for example a video sequence, objects depicted in the images with well-defined edges often are found to move about within a given field of view of the images, resulting in the splitting of blocks following movements of the objects. In still images the splitting of blocks typically creates the result that follows the edges in the spatial image. When the splitting of blocks is illustrated from the still image the objects can often be detected from it.

The method of encoding pursuant to the disclosure, for example as depicted in FIG. 2, is capable, via layer and channel encoding executed in the encoder 10, capable of supporting interactive video presentations for providing new types of content delivery services, for example interactive commercial advertisements, different viewing perspectives when streaming live sports activities such as Formula I and so forth, and movies. For example, the encoder 10 allows for movies with localized subtitle layers, interactive watermarks, interactive pattern recognition, animated 2D/3D user interface (UI) buttons and so forth.

Figure 4:
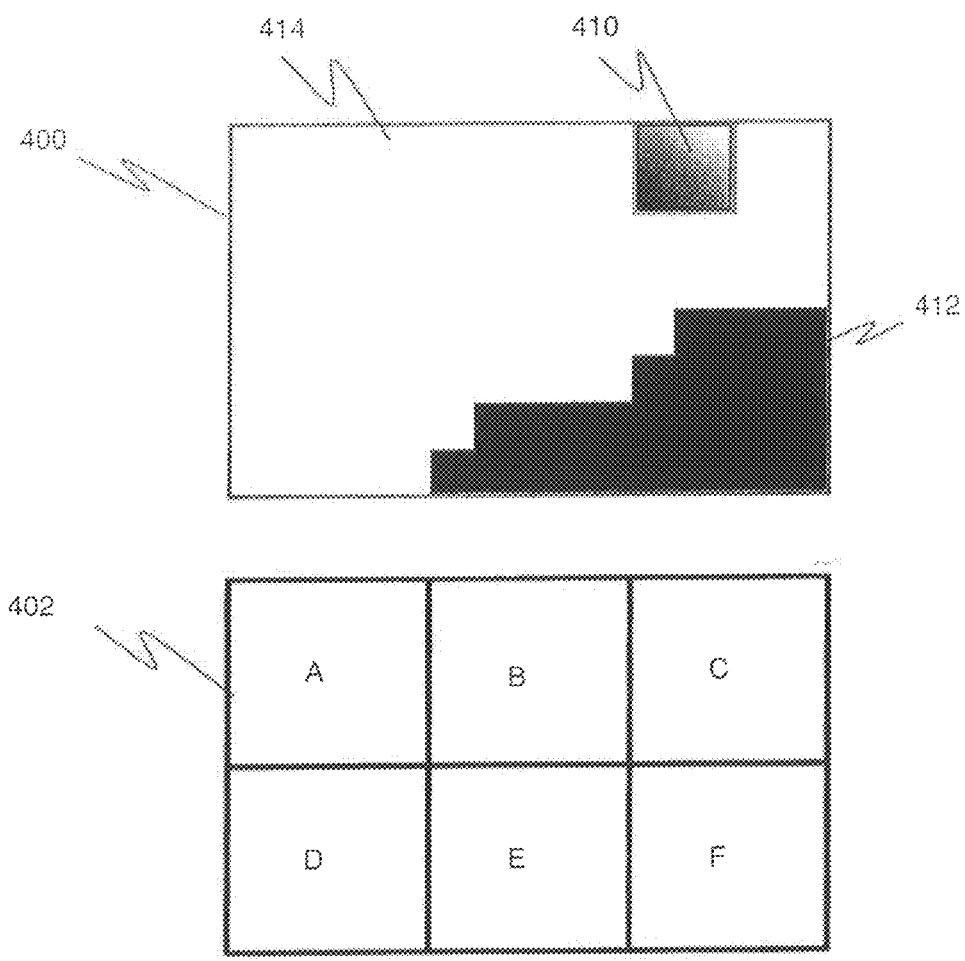
FIG. 4 is an example image and example initial image split to be used according to embodiments.
Figure 5:
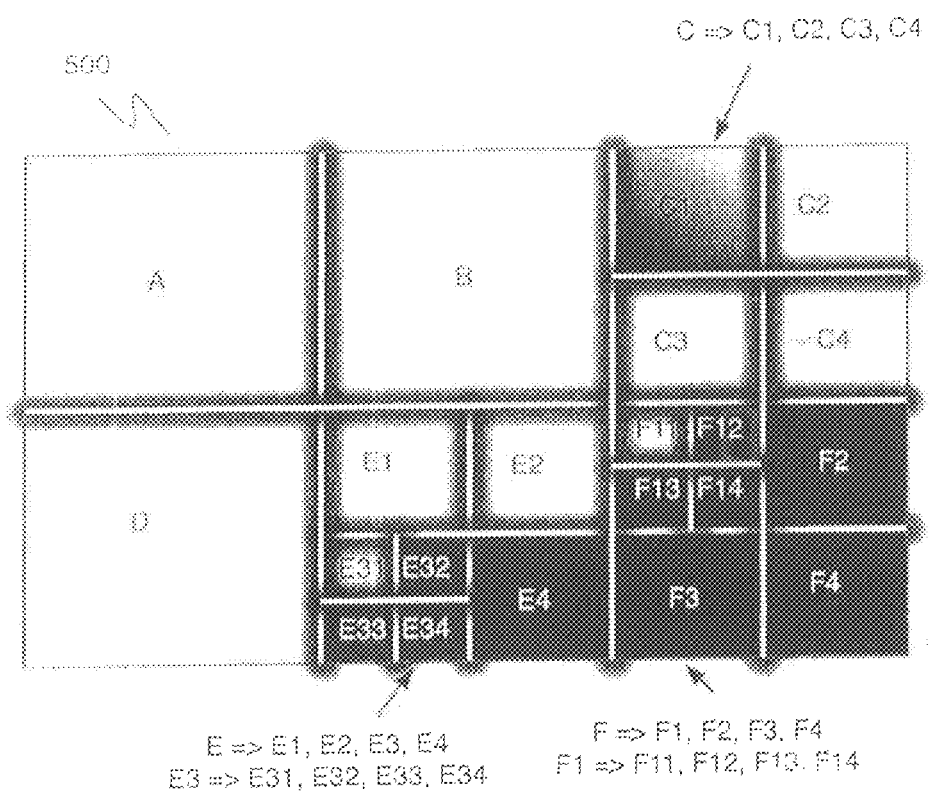
FIG. 5 is an example blocks of the example image of FIG. 4.

Simplified example of an embodiment of encoding is shown in FIG. 4. An image 400 to be encoded has a flat blue area 414, shown as white in the FIG. 4 for clarity, a green area 412, shown dotted in FIG. 4 for clarity, and a sliding red area 410, shown as sliding dotted shading in FIG. 4 for clarity. The size of image 400 can be arbitrary, for example 12×8 elements or pixels, or 24×16 elements or pixels, or 120×80 elements or pixels, and so forth. Initial block sizes 402 for the image 400 are selected as 4×4 elements or pixels, or 8×8 elements or pixels, or 40×40 elements or pixels respectively for different image sizes. In the embodiment, there are six element or pixel blocks A, B, C, D, E and F as illustrated. According to the embodiment, the first block A is analysed. The block A is determined from the analysis to be uniform and consisting of only blue, with color value represented by number 10. The block A is considered as one area. The block B is analysed next. The block B consists also of only blue, therefore it is considered as one area. The block C is analysed next. The block C is not uniform, therefore it is split to four sub-blocks denoted by C1, C2, C3 and C4. The first sub-block C1 is analysed. It consists of a sliding red area, with a color value of 15 in its lower left corner, values of 20 in top-left and bottom-right corners of the sub-block C1, and a value of 25 in top-right corner of the sub-block C1. The sub-block C1 is considered as one area. The sub-blocks C2, C3 and C4 are analysed respectively. The sub-blocks C2, C3 and C4 consist of flat blue and are each denoted as flat blue areas. The block D is analysed next. The block D has only one color, namely flat blue, and is considered as one area. The block E is analysed next. The block E is not uniform and it is thus split into four sub-blocks E1, E2, E3 and E4. The sub-blocks E1 and E2 are both uniform with a color of flat blue. The sub-block E3 is not uniform and it is split further into four sub-blocks E31, E32, E33 and E34. Each sub-block E31, E32, E33 and E34 is analysed. The sub-block E31 is analysed to consist of uniform color of blue and is marked as a flat blue area. The sub-blocks E32, E33 and E34 are analysed to be green, with a color value of 5 as an example, and are designated to be green. The sub-block E4 is analysed and determined to be uniform and designated as color green. The block F is analysed and determined not to be uniform. The block F is split to four sub-blocks F1, F2, F3 and F4. The sub-block F1 is analysed and determined not to be uniform. The sub-block F1 is split further to sub-blocks F11, F12, F13 and F14. Each sub-block F11, F12, F13 and F14 is analysed. The sub-block F11 is determined to be uniform with a color blue. The sub-blocks F12, F13 and F14 are determined to be uniform with a color green. Values are associated with blocks and sub-blocks respectively. The sub-blocks F2, F3 and F4 are further analysed and determined to be uniform with a color green. Values are associated with the blocks and sub-blocks respectively.

An example of implementing code for the aforementioned encoding process is to give a value "0" for a block which is not split, and a value "1" for a block which needs to be split. Using such logic, the above example is coded as following Split Bits: 0 0 1 0000 0 1 0010 0000 1 1000 0000, Wherein a first two logic values "0" illustrate that the two initial blocks A, B are not split, the third block C is split and defined by a logic value "1" as aforementioned, but the sub-blocks are not split, the fourth block D is not split, the fifth block E is split, the first two sub-blocks E1, E2 are not split, but sub-block E3 is split, and so forth. The Bit String can further be, for example, run length coded.

A further "fill" method for each block can be coded, for example, with a logic value of "0" for assigning flat color for the block, and a logic value "1" for assigning sliding color for the block, referred to as Method Bits:
0 0 1 0 0 0 0 0 0 0 0 0 0 0 0 0 0 0 0 0

In the code, first two blocks A, B are flat color, the next block C1 is sliding and a remainder are flat color. The Method Bits can further be, for example, run length coded.

Color values respectively for the blocks are referred as Values, as follows:
10 10 20 25 15 20 10 10 10 10 10 10 5 10 5 5 5 5 5 5 10 5 5 5
wherein a set "20, 25, 15, 20" describe color values of each corner of the block C1. The string of Values can be, for example, Huffman coded to reduce data size. Moreover, since the group of sub-blocks E31, E32, E33 and E34 and the group of sub-blocks F11, F12, F13 and F14 have same color values combination and order, namely (10, 5, 5, 5), it can be considered as one element and designated its own value, referred as Combination Value. The Combination Value can be stored in a database, for example of the encoder or a corresponding decoder, and referred to as a Reference Identification number when needed. Often, it is beneficial to use separate streams for values for different methods, for example, in example described in the foregoing wherein DC values and slide values can be set to separate streams. Some methods optionally also generate multiple streams by themselves to enable a smaller entropy for each stream that enables better compression efficiency within entropy coding methods, for example using a multilevel method wherein high and low levels used when implementing the method can be set to process separate streams, because often high values are more close to each other, similarly as low values are more close to each other, and then range coding that uses delta coded high or low values operates efficiently.

According to embodiments Split Bits, Method Bits, Values and Combination Values can be stored in encoder hardware, for example for subsequent supply to other hardware for decoding purposes.

Figure 6:
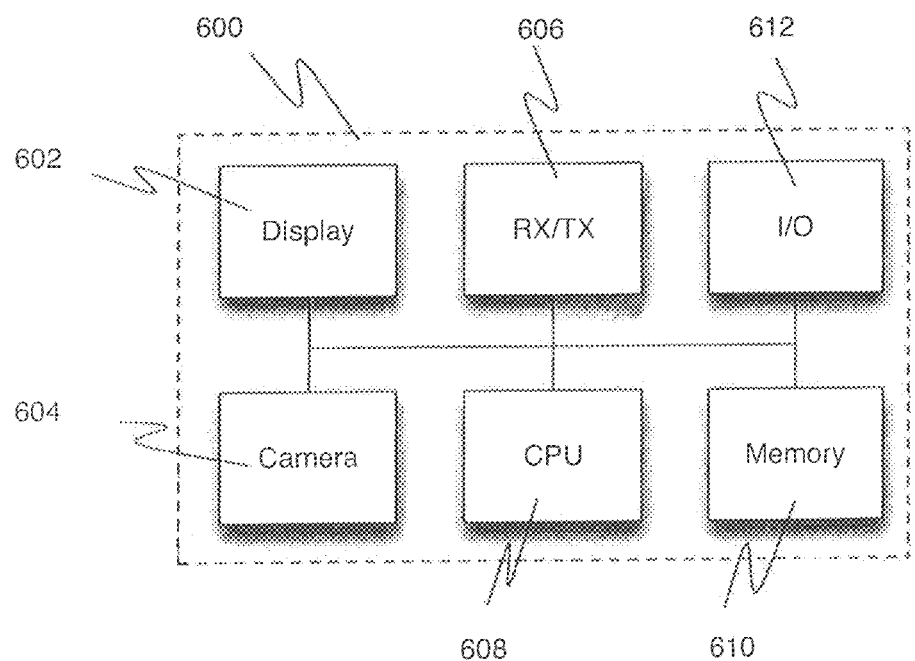
FIG. 6 illustrates blocks of portable device in which encoding is implemented.

In one embodiment, the encoding can be implemented in a portable device 600 of FIG. 6, such as a smart phone, a digital camera or a video camera. The portable device 600 optionally includes a camera (KAM) 604 for capturing one or more images, a display (DISP) for showing the one or more images, a receiver/transmitter (RX/TX) 606 to enable communication using cellular wireless networks or local area networks, and other Input/Output (I/O) 612 such as Universal Serial Bus (USB) or Ethernet, a Central Processing Unit (CPU) 608 for executing encoder related algorithms and instructions, and a memory (MEM) 610 for storing the one or more images from the camera 604, software for the encoder and encoded image content. The portable device 600 is beneficially configurable to store one or more encoded images in its local memory 610, and/or it can be configured to send periodically, upon request, upon user action, in real-time or substantially real time, encoded images via the receiver/transmitter (RX/TX) 606 or via the Input/Output (I/O) 612 to external systems.

In the foregoing, RD optimization is employed to minimize a RD value which is derived from Equation 1 (Eq. 1) as follows:

$$RD = (E) + (\lambda \cdot (B_C))$$ Eq. 1 wherein
E=error;
X=a coefficient defining a cost of a bit count as a function of the error E;
$B_C$=bit count.

The error E can be, for example, MAE, MSE, MAX or some weighted combination of such parameters, for example MAE+MAX. The parameter λ refers to the aforesaid coefficient with which a cost of the bit count BC can be made comparable with regards to the error E; the parameter λ becomes larger as less bits are used for encoding, wherein more error is allowed, namely in a situation where there arises a large data compression corresponding to a smaller quality criterion value. Correspondingly, the parameter λ becomes smaller as more bits are used for encoding, wherein less error is allowed, namely in a situation where there arises a small data compression corresponding to a greater quality criterion value.

In respect of encoding quality criterion, it can, for example, be associated with evenness, such as a measure of variance. An estimate of RD value is often beneficial to employ, because it decreases an amount of processing required when determining encoding quality. The value of bit count used in RD-value calculation is often estimated, because the actual value is often very difficult to calculate, since it depends on other data values and selected entropy coding method. Bits can be estimated based on the amount of bits needed for value delivery, multiplied by estimated compression factor that can be predefined for the data stream or it can be modified adaptively based on the previous compressed and delivered data.

When implementing aforementioned embodiments, data compression employed includes two distinct phases. A method for data compression is selected that produces selection information, wherein the selection information defines the method and types of quantized data generated by the method. The selection information can be entropy coded, for example for inclusion in the output data 30. When generating the output data 30, it is also optionally possible to employ multiple streams, for example for whole images or for Initblocks. Employing such multiple streams is beneficial in reducing entropy in the compressed output data 30.

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

The invention claimed is:

1. A method of encoding input data to generate corresponding encoded output data, comprising the steps of:
   (a) dividing the input data into a plurality of blocks or packets, the blocks or packets having a size depending upon a nature of their data content and/or data type, and the blocks or packets being of one or more sizes;
   (b) applying a plurality of different types of transformations to content of the blocks or packets to generate corresponding transformed data;
   (c) checking a quality of representation of the transformed data of individual blocks or packets compared to the content of the individual blocks or packets prior to application of the transformations to determine whether or not the quality of representation of the transformed data satisfies one or more quality criteria;
   (d) in an event that the quality of representation of the transformed data of the one or more blocks or packets does not satisfy the one or more quality criteria, subdividing or combining the one or more individual blocks or packets whose quality of representation does not satisfy the one or more criteria further and repeating step (b) for the one or more blocks or packets whose quality of representation does not satisfy the one or more criteria; and
   (e) in an event that the quality of representation of the transformed data of the one or more blocks or packets satisfies the one or more quality criteria, outputting the transformed data to provide the encoded output data representative of the input data to be encoded.

2. The method as claimed in claim 1, further comprising using the plurality of transformations to compress content associated with the blocks or packets, so that the encoded output data is smaller in size than the input data to be encoded.

3. The method as claimed in claim 1, further comprising arranging for the one or more quality criteria to be dynamically variable during encoding of the blocks or packets depending upon a nature of content included within the blocks or packets.

4. The method as claimed in claim 1, wherein the blocks or packets are subdivision or combined so that at least one of their representative parameters describing their content is substantially flat within their sub-divided and/or combined blocks or packets.

5. The method as claimed in claim 1, wherein the blocks or packets correspond to a series of data, wherein subdivision of the input data corresponding to a given information to form the plurality of corresponding blocks is made dependent upon content present in one or more data preceding the given information within the temporal sequence of data.

6. The method as claimed in claim 1, further comprising adding header information to the transformed data in step (e) to generate the encoded output data, wherein the header information includes information indicative of the transformations employed in step (b).

7. The method as claimed in claim 1, wherein step (b) comprises fetching supplementary information from a database arrangement for use when executing said at least one transformation, wherein the supplementary information includes at least one of: algorithms, rules, one or more transformation parameters.

8. The method as claimed in claim 7, further comprising adding header information to the encoded output data indicative of the database arrangement for enabling subsequent decoding of the encoded output data to access said supplementary information when decoding the encoded output data.

9. The method as claimed in claim 1, further comprising employing for the transformations one or more of the following as transform methods used for encoding: a data base coding method, a DC-value coding method, slide coding method, scale coding method, line coding method, multilevel coding method, interpolation coding method, extrapolation coding method, Discrete Cosine Transform (DCT), pulse code modulation (PCM), Differential Pulse Code Modulation (DPCM), Run-Length Encoding (RLE), Split Run-Length Encoding (SRLE), Entropy Modifier (EM), Lempel-Ziv Obehumer (LZO), Variable Length Coding (VLC), Huffmancoding, arithmetic coding, range coding, transform coding, delta coding, ODelta coding, bzip2-specific RLE, color conversion coding method, quantization, wavelet transform, Hadamard transform, linear transform and inverse methods of all mentioned.

10. The method as claimed in claim 1, further comprising encoding at least one of video, image, audio, graphics, economic data, mask data, multidimensional data (3D), text data, texture data, Electrocardiogram (ECG), seismic, ASCII, Unicode, calendar data, mathematical data and binary information present in the input data.

11. The method as claimed in claim 1, further comprising encoding multiple channels and/or layers in the encoded output data for providing at least one of: interactive video, commercial advertisements, a plurality of viewpoints during sports event reporting, interactive watermarks, interactive pattern recognition, animated 20/30 user interface buttons.

12. The method as claimed in claim 1, further comprising providing the encoded data to at least one of following destinations: a data memory device, a communication network, a memory card, data memory disks, and local area communication networks (LANs), directly to a decoder.

13. The method as claimed in claim 1, wherein step (a) comprises initially splitting the input data into one or more blocks based on at least one of:
(1) image resolutions;
(2) an amount of data;
(3) a content of data;
(4) maximum block or packet size; and
(5) a quality parameter.

14. The method as claimed in claim 1, further comprising utilizing only a single processing unit.

15. A non-transitory computer-readable data storage media comprising computer instructions which when executed by a processor cause the processor to perform the method as claimed in claim 1.

16. An encoder operable to encode input data to generate corresponding encoded output data, comprising data processing hardware which is operable:
(a) to divide the input data into a plurality of blocks or packets, the blocks or packets having a size depending upon a nature of their data content and/or data type, and the blocks or packets being of one or more sizes;
(b) to apply a plurality of different types of transformations to content of the blocks or packets to generate corresponding transformed data;
(c) to check a quality of representation of the transformed data of the individual blocks or packets compared to the content of the individual blocks or packets prior to application of the transformations to determine whether or not the quality of representation of the transformed data satisfies one or more quality criteria;
(d) in an event that the quality of representation of the transformed data of the one or more blocks or packets does not satisfy the one or more quality criteria, to subdivide or combine the one or more individual blocks or packets whose quality of representation does not satisfy the one or more criteria further and repeating step (b) for the one or more blocks or packets whose quality of representation does not satisfy the one or more criteria; and
(e) in an event that the quality of representation of the transformed data of the one or more blocks or packets satisfies the one or more quality criteria, to output the transformed data to provide the encoded output data representative of the input data to be encoded.

17. The encoder as claimed in claim 16, wherein the encoder is operable to use the at least one transformation to compress content associated with the blocks or packets, so that the encoded output data is smaller in size than the input data to be encoded.

18. The encoder as claimed in claim 16, wherein the encoder is operable to arrange for the one or more quality criteria to be dynamically variable during encoding of the blocks or packets depending upon a nature of content included within the blocks or packets.

19. The encoder as claimed in claim 16, wherein the blocks or packets are sub-divided or combined so that at least one of their representative parameters describing their content is substantially flat within their sub-divided and/or combined blocks or packets.

20. The encoder as claimed in claim 16, wherein the blocks or packets correspond to a series of data, wherein subdivision of the input data corresponding to a given information to form the plurality of corresponding blocks is made dependent upon content present in one or more data preceding the given information within the temporal sequence of data.

21. The encoder as claimed in claim 16, wherein the encoder is operable to add header information to the transformed data to generate the encoded output data, wherein the header information includes information indicative of the transformations employed by the encoder.

22. The encoder as claimed in claim 16, wherein the encoder is operable to fetch supplementary information from a database arrangement for use when executing the transformations, wherein the supplementary information includes at least one of: algorithms, rules, one or more transformation parameters.

23. The encoder as claimed in claim 22, wherein the encoder is operable to add header information to the encoded output data in a manner indicative of the database arrangement for enabling subsequent decoding of the encoded output data to access the supplementary information when decoding the encoded output data.

24. The encoder as claimed in claim 16, wherein the encoder is operable to employ for the transformations one of more of the following as transform methods used for encoding: data base coding method, DC-value coding method, slide coding method, scale coding method, line coding method, multilevel coding method, interpolation coding method, extrapolation coding method, Discrete Cosine Transform (DCT), pulse code modulation (PCM), Differential Pulse Code Modulation (DPCM), Run-Length Encoding (RLE), Split Run-Length Encoding (SRLE), Entropy Modifier (EM), Lempel-Ziv Obehumer (LZO), Variable Length Coding (VLC), Huffman-coding, arithmetic coding, range coding, transform coding, delta coding, ODelta coding, bzip2-specific RLE, color conversion coding method, quantization, wavelet transform, Hadamard transform, linear transform and inverse methods of all mentioned.

25. The encoder as claimed in claim 16, wherein the encoder further comprises only a single processing unit.

26. The method as claimed in claim 1, further comprising the step of communicating the information regarding the splitting or combining with the data.

27. The encoder as claimed in claim 16, wherein the data processing hardware is also operable to communicate information regarding the splitting or combining with the data.

28. The method as claimed in claim 1, further comprising utilizing only a single memory device.

29. The method as claimed in claim 1, further comprising utilizing only a single receiver.

30. The encoder as claimed in claim 16, wherein the encoder further comprises a single memory device.

31. The encoder as claimed in claim 16, wherein the encoder further comprises a single receiver.

* * * * *